United States Patent [19]
Martinez

[11] Patent Number: 5,163,793
[45] Date of Patent: Nov. 17, 1992

[54] MACHINE TOOL INSTALLATION FOR SUPPORTING AND MACHINING WORKPIECES

[76] Inventor: Manuel T. Martinez, Sancho El Fuerte, 21, E-31007 Pamplona, Spain

[21] Appl. No.: 804,366

[22] Filed: Dec. 10, 1991

[30] Foreign Application Priority Data

Apr. 5, 1991 [ES] Spain .................................. 9100894
May 22, 1991 [ES] Spain .................................. 9101588

[51] Int. Cl.⁵ ........................... B23C 1/06; B25B 11/00
[52] U.S. Cl. ................................... 409/205; 269/309; 409/212; 409/219
[58] Field of Search ................ 29/56.6, 56.5; 409/205, 409/118, 212, 218, 219, 225, 227, 220, 202, 241; 83/468.2, , 467.1, 953; 269/289 R, 296, 297, 299, 300, 320, 309, 310, 900; 51/216 R, 240 R, 240 EB

[56] References Cited

U.S. PATENT DOCUMENTS

| | | |
|---|---|---|
| 2,701,723 | 2/1955 | Ekberg . |
| 3,253,665 | 5/1966 | Schienle . |
| 3,537,701 | 11/1970 | Claycomb .......................... 269/309 |
| 3,681,834 | 8/1972 | Seidenfaden . |
| 3,910,159 | 10/1975 | Gladwin ............................. 409/118 |
| 4,205,834 | 6/1980 | Demuth et al. ................. 409/225 X |
| 4,397,598 | 8/1983 | Ess et al. .............................. 414/677 |
| 4,527,783 | 7/1985 | Collora et al. ................... 269/297 X |
| 4,583,891 | 4/1986 | Eschenfelder et al. ........ 409/212 X |
| 4,604,021 | 8/1986 | Werner .................................. 414/226 |
| 4,711,016 | 12/1987 | Genschow et al. ................... 29/568 |
| 5,005,814 | 4/1991 | Gumbert .............................. 269/309 |
| 5,026,033 | 6/1991 | Roxy .............................. 269/900 X |

FOREIGN PATENT DOCUMENTS

| | | |
|---|---|---|
| 0069230 | 5/1982 | European Pat. Off. . |
| 338132 | 10/1989 | European Pat. Off. ............ 269/310 |
| 1903576 | 8/1970 | Fed. Rep. of Germany . |
| 2229538 | 10/1973 | Fed. Rep. of Germany ...... 269/320 |
| 2083018 | 12/1971 | France . |
| 2631099 | 11/1989 | France .................................. 269/309 |
| 264920 | 3/1970 | U.S.S.R. .............................. 269/296 |
| 120697 | 11/1918 | United Kingdom . |

Primary Examiner—William Briggs
Attorney, Agent, or Firm—Mason, Fenwick & Lawrence

[57] ABSTRACT

A machine tool installation comprising a frame, a track along which the frame is movable, a machining head on the frame and movable transversely of the track and workpiece support means, wherein the support means comprises a plurality of modules extending transversely of the track and independently movable along the track, a plurality of columns on each of the modules, each of the columns being independently movable along the modules, a workpiece fixing member at the upper end of each column and which can be moved vertically, and computer control means for controlling all the aforesaid movements in three perpendicular directions to permit the automatic positioning of the fixing members until they occupy the desired positions for supporting and fixing the workpiece during machining.

9 Claims, 11 Drawing Sheets

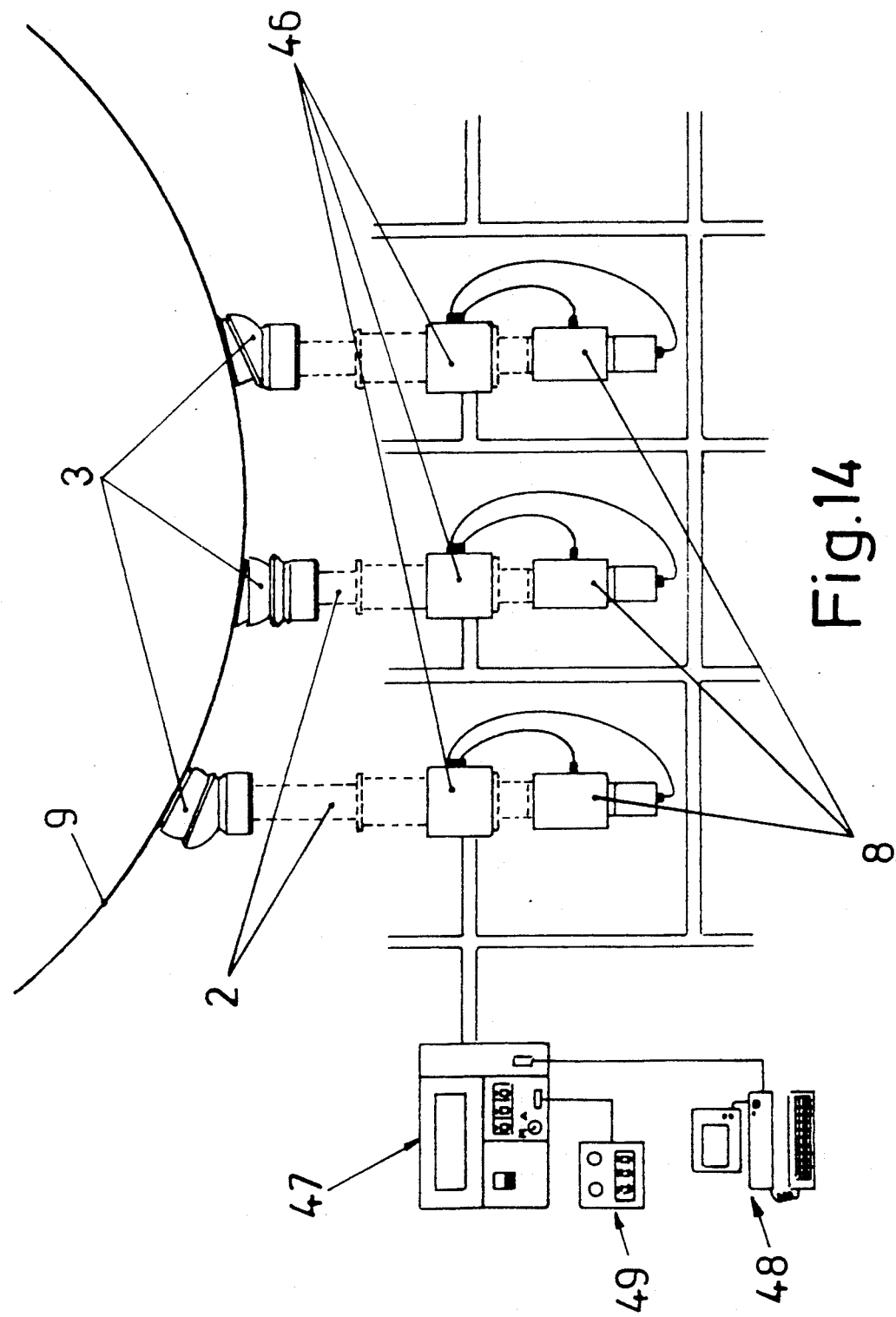

MACHINE TOOL INSTALLATION FOR SUPPORTING AND MACHINING WORKPIECES

The invention relates to a machine tool installation for supporting and machining workpieces. In sectors such as the aeronautical and shipping industry, it is necessary to carry out processes for the machining of workpieces which in many cases are large dimensions and have a variety of shapes, which considerably complicates the handling and the secure fastening of such workpieces during the working processes.

For this purpose installations are already known formed by a rigid frame which comprises the corresponding machining, boring, riveting, or laser head, etc in order to work on the parts to be machined which are arranged below said frame; employing, for the fastening of the parts, support columns, equipped at their free ends with support means which allow the parts which are to be worked upon to be rested on them.

Now, given that such machining processes must be developed with as much automation as possible, it is desirable to rely on a system of positioning of the parts to be machined, which is versatile in its adaptation to any type of part with regard to its size, shape and arrangement; at the same time all this must be achieved with precision. These prerequisites are not met, at least in sufficient measure, with the installations which are known up to now, in which the positioning of the columns supporting the parts has to be made individually and by hand, which means that said positioning is slow and complicated.

In the known solutions as exemplified by French Patent 2.083.018, the GB Patent 120.697 and the U.S. Pat. 3,681,834, the solutions offered are based on column-like supports which in their upper end have means for the support of the parts to be worked on; but in all these the positioning of the supports must be done manually, in a rudimentary way, which means that the positioning of such supports is a slow process because of the particular shapes and sizes of the different pieces to be machined. This can lead to inaccuracies in the arrangement of such supports.

In accordance with the object of the present invention an installation is proposed by which it is possible automatically to position in space parts of a different surface size and shape, which, moreover allows exact positioning of the parts to be achieved, automatically and completely independently of the shapes and sizes which the said parts may have.

The installation which is the object of the present invention comprises a multiplicity of support columns, which are grouped on modules arranged in transverse direction on longitudinal guides of the installation.

Each support column incorporates its own motor, which drives the vertical movements of the fixing members for the parts to be worked on, these being in the upper end of the column, each column being in its turn individually attached to means of driving its movement along the corresponding carrying module; while said carrying modules of the columns may in their turn be moved individually along the longitudinal guides on which they are mounted; all this being under the control of a computer programme which commands the whole system from an information unit.

An installation is thus obtained in which, in a way which is completely automatic, fast and absolutely precise, each one of the support columns can be positioned with movements along three perpendicular directions (axes X, Y and Z), for the siting of the fixing element at the upper end of each column, at the precise point in space above which the support for the part to be fastened is to be positioned, in accordance with the shape which each part has and the position which the same must occupy in each case.

On the other hand, the present invention offers also a special realisation of the fixing members which are arranged at the upper ends of the support columns. In effect, in accordance with U.S. Pat. No. 2,701,723 a realisation is known in which the fixing members are valve like suction cups which by means of a vacuum are fixed to the parts arranged above them. The U.S. Pat. No. 3,253,665 offers a solution in which the fixing members themselves are able to blow in air to facilitate the movement over them of the parts to be machined. On the other hand, the German Patent 1.903.576 and the European Patent 0 069 230 have other realisations of such fixing members.

In the solutions known until now it turns out that the fixing member or valve properly speaking is capable of rotating in order to adapt itself to the different inclinations of the parts to be worked, but this rotation is limited by the actual shape and make up of the valve; so that the plane which comprises the upper edge of the latter cannot adopt inclinations of more than twenty five degrees in relation to the horizontal plane.

In accordance with the present invention the fixing members are made up following a realisation which has two complementary sets of joints by which the plane which comprised the upper edge of the fixing members can reach up to forty five degrees in relation to the horizontal plane.

On the other hand, and according to the present invention the lays of the cables and the conduits which must go to each column are grouped in such a way as to be concealed within protective reinforcements situated below floor level; while the moving means of the column carrying modules along the installation, as well as the corresponding means of moving the frame carrying the machining head or heads, are arranged for their part in a concealed position under the floor. In this way adequate protection is assured for all the cables and conduits for connection to the support columns and to the abovementioned motor means of the transverse modules and of the frame, at the same time as in the space occupied by the installation there is a surface totally free from obstruction and elements likely to cause accidents; while the cleaning of the said space thus becomes exceptionally easy to undertake.

The invention is diagrammatically illustrated, by way of example in the accompanying drawings, in which:

FIG. 5 and 5a are an amplified front views of the assembly of a mechanism for moving the modules (1), with a detail from a joint (17) for closing channels on the floor;

FIG. 14 shows is a diagram showing means for the automatic control of the positioning of the members (3)

Clarifying Details

Figure 1:
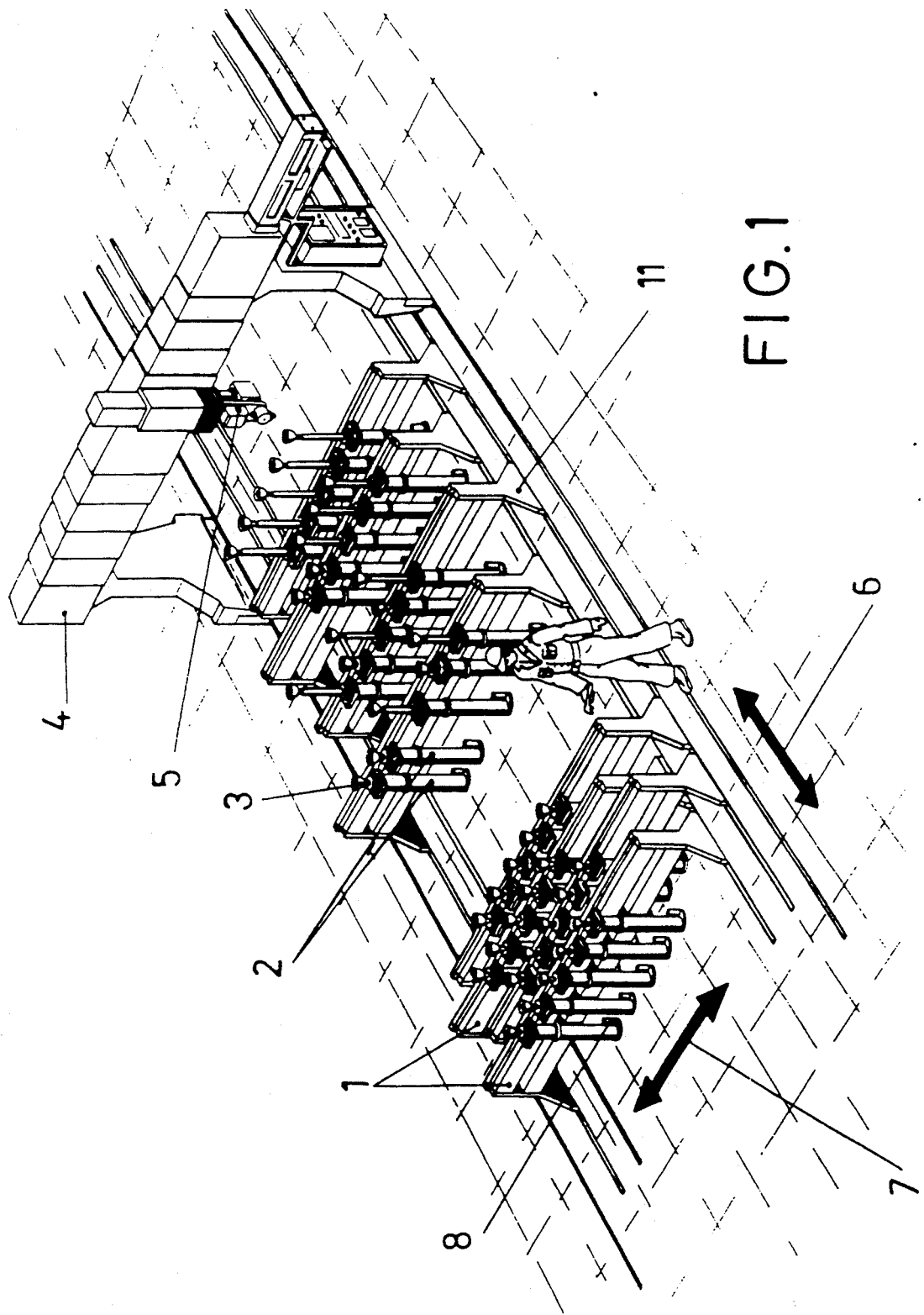
FIG. 1 shows a representation in perspective and schematically of one practical embodiment of machine tool installation.
Figure 2:
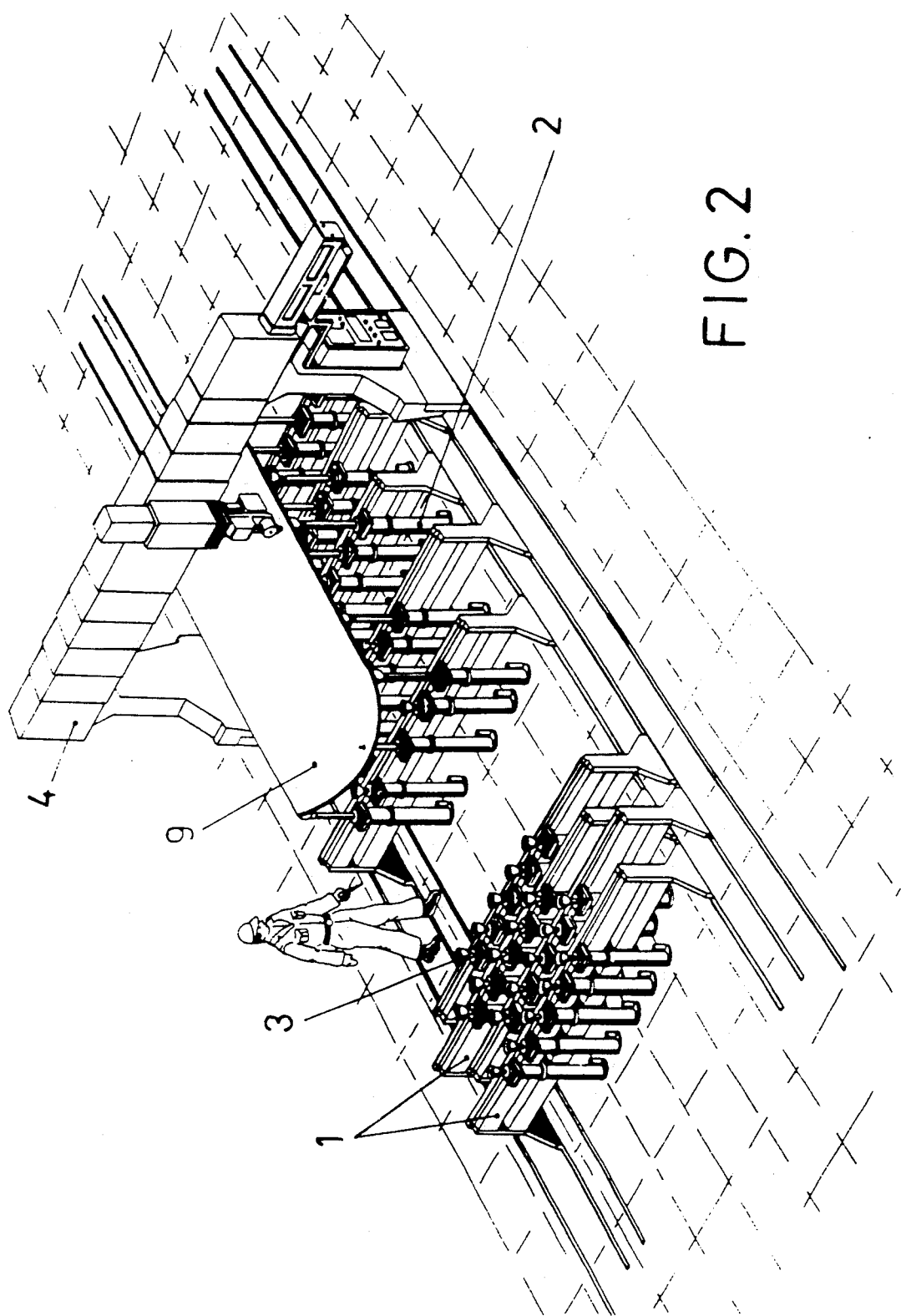
FIG. 2 is a perspective view corresponding to FIG. 1 but with a workpiece in place.

1. Modules
2. Columns
3. Fixing member
4. Frame
5. Head
6. Longitudinal direction
7. Transverse direction
8. Motor
9. Workpiece to be machined
10. Beams
11. Side plates of the modules
12. Pinion
13. Rack
14. Reduction motor
15. Impulse meter
16. Cable carrying chains
17. Flexible joints
18. Guides
19. Support plate
20. Shoes
21. Leadscrew
22. Motor
23. Body
24. Hollow stem
25. Leadscrew
26. Toothed belt
27. Impulse meter
28. Double clamp
29. Joints
30. Spring means
31. Beams
32. Side plates of the frame
33. Cable carrying chains
34. Enclosure
35. Enclosure
36. "U"-shaped profiles
37. Steel strip
38. Upper shell
39. Lower shell
40. Seating bush
41. Connecting rod
42. Connecting rod retaining bush
43. Suction cup
44. Suction orifices
45. Filters
46. Control unit
47. Central processing unit (CPU)
48. Controlling computer
49. Remote control unit In the drawings, a support installation for the machining of workpieces is shown which, in its general structure is formed, as can be seen in FIG. 1, by a frame (4) which carries a head (5) which carries the machining tools, and by a set of modules (1) which are arranged parallel to the aforementioned frame (4) in the transverse direction to the installation, each module (1) comprising a series of columns (2) which at their upper end are equipped with a fixing member (3) for the support, on the fixing members (3), of the workpieces (9) which have to be supported for machining.

Figure 3:
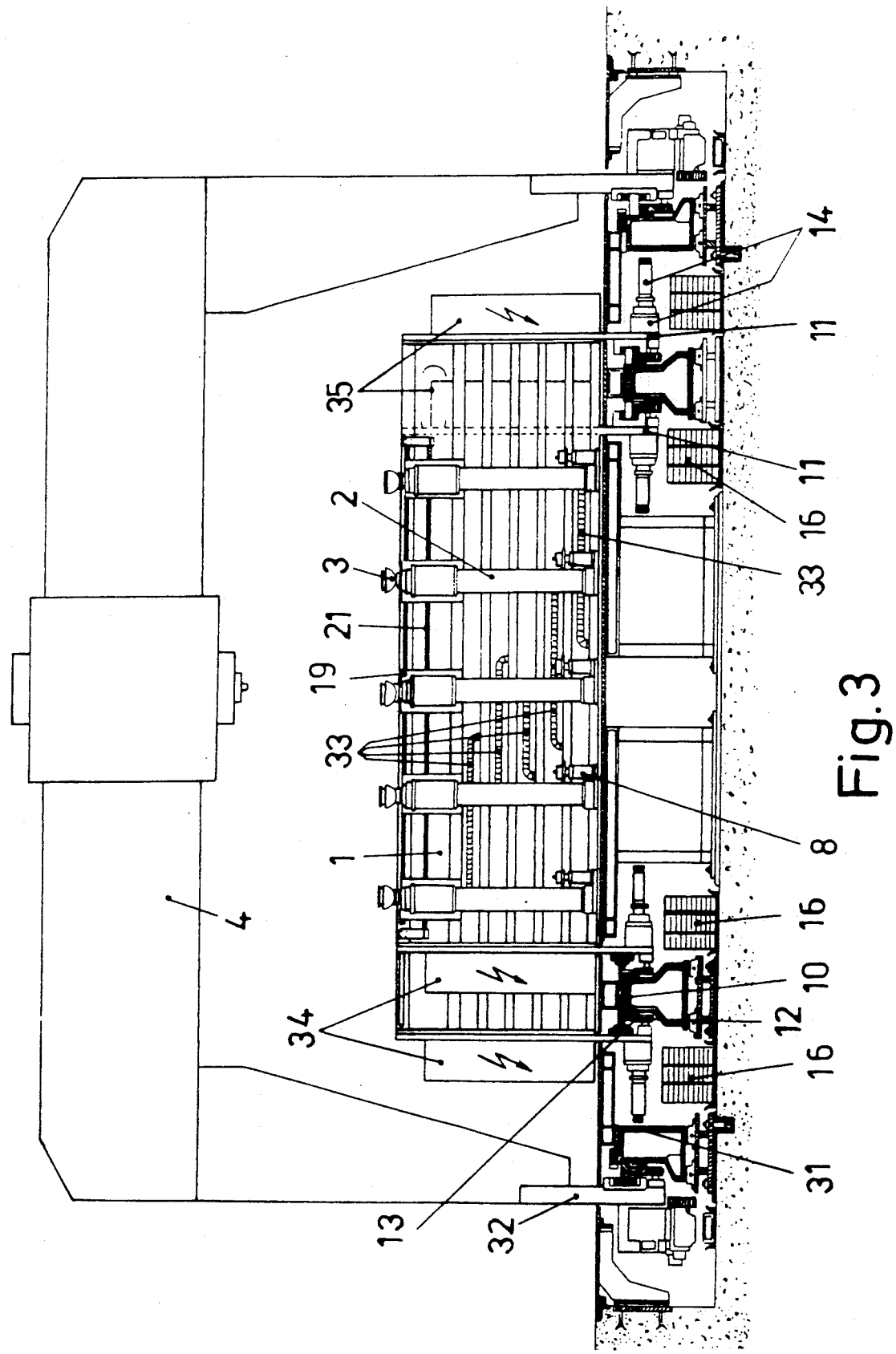
FIG. 3 is a front view of the installation, showing in cross section the part of the mechanism which is situated below floor level.
Figure 4:
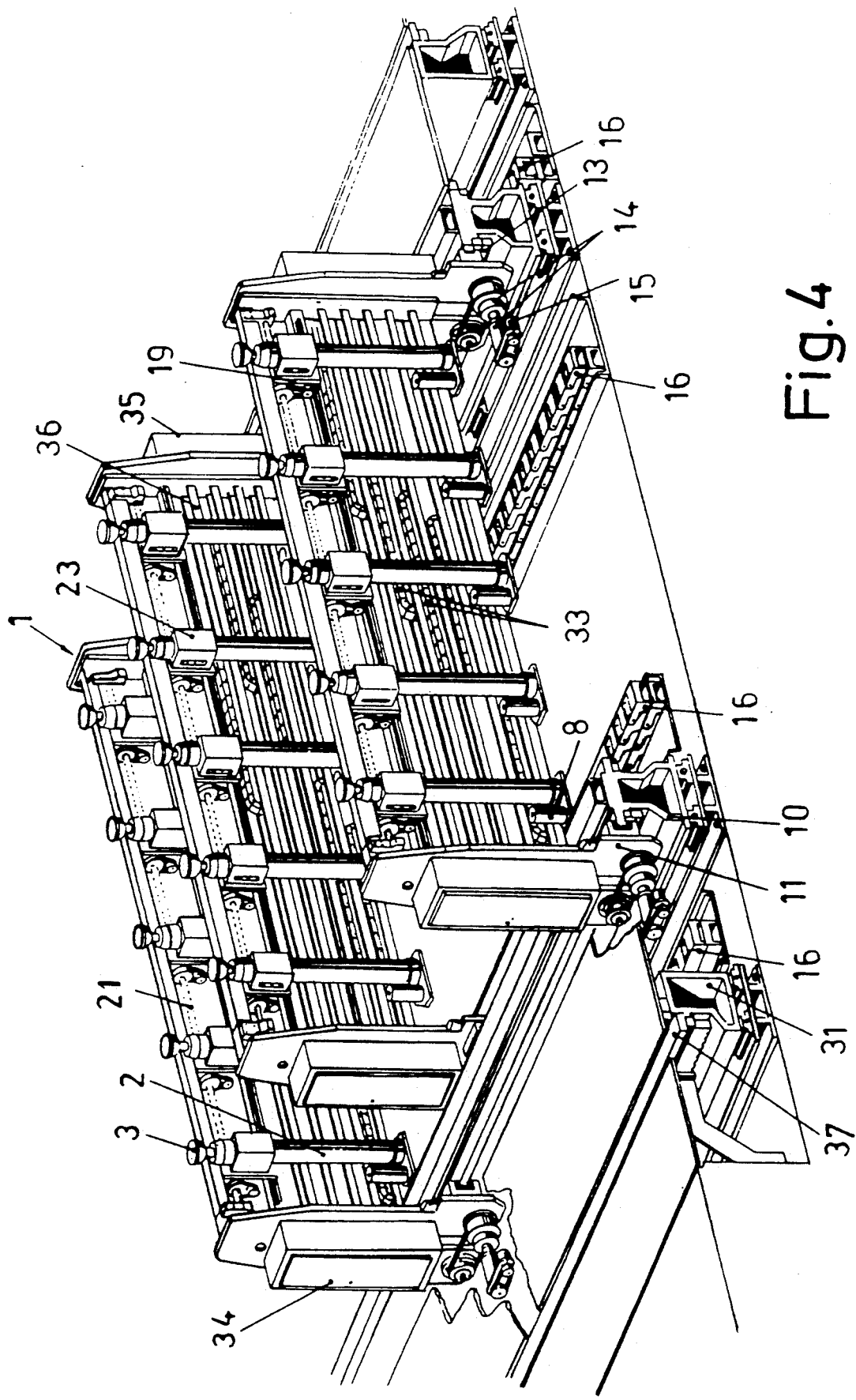
FIG. 4 is a perspective view of the front part of the installation shown in FIG. 3.
Figure 5:
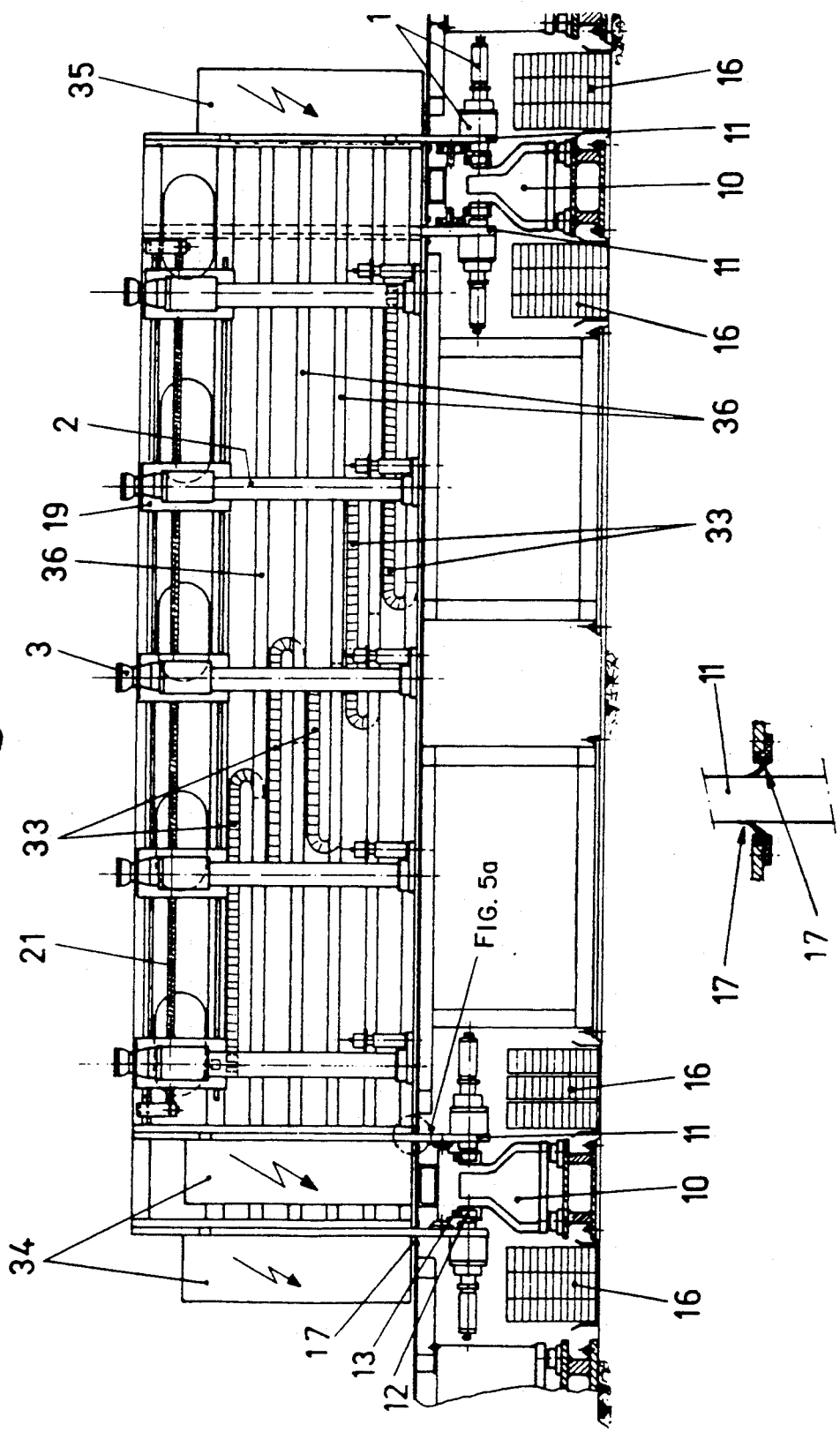

Each module (1) is supported on beams (10) which are arranged under the floor in the longitudinal direction of the installation, as can be seen in FIGS. 3, 4 and 5, and which make guides for the moving of the said modules (1) in that direction longitudinal to the installation, following the direction (6) indicated in FIG. 1, it having been foreseen that the guiding of the aforementioned modules (1) should be achieved alternatively on one side and the other of the aforementioned beams (10), to which end the corresponding plates (11), by means of which their mounting on the guides is achieved, can be larger in width, thus providing greater rigidity.

Said moving of the modules (1) in the longitudinal direction of the installation which is indicated with the arrow (6) in FIG. 1, takes place by means of respective rack (13) and pinion (12) assemblies, from both ends of the module (1), through actuation by means of respective sets of reduction motors (14), in such a way that the two respective motors corresponding to each module (1), work in synchronization, being controlled in their position by appropriate impulse meters (15) (see FIG. 4).

Figures 7, 8:
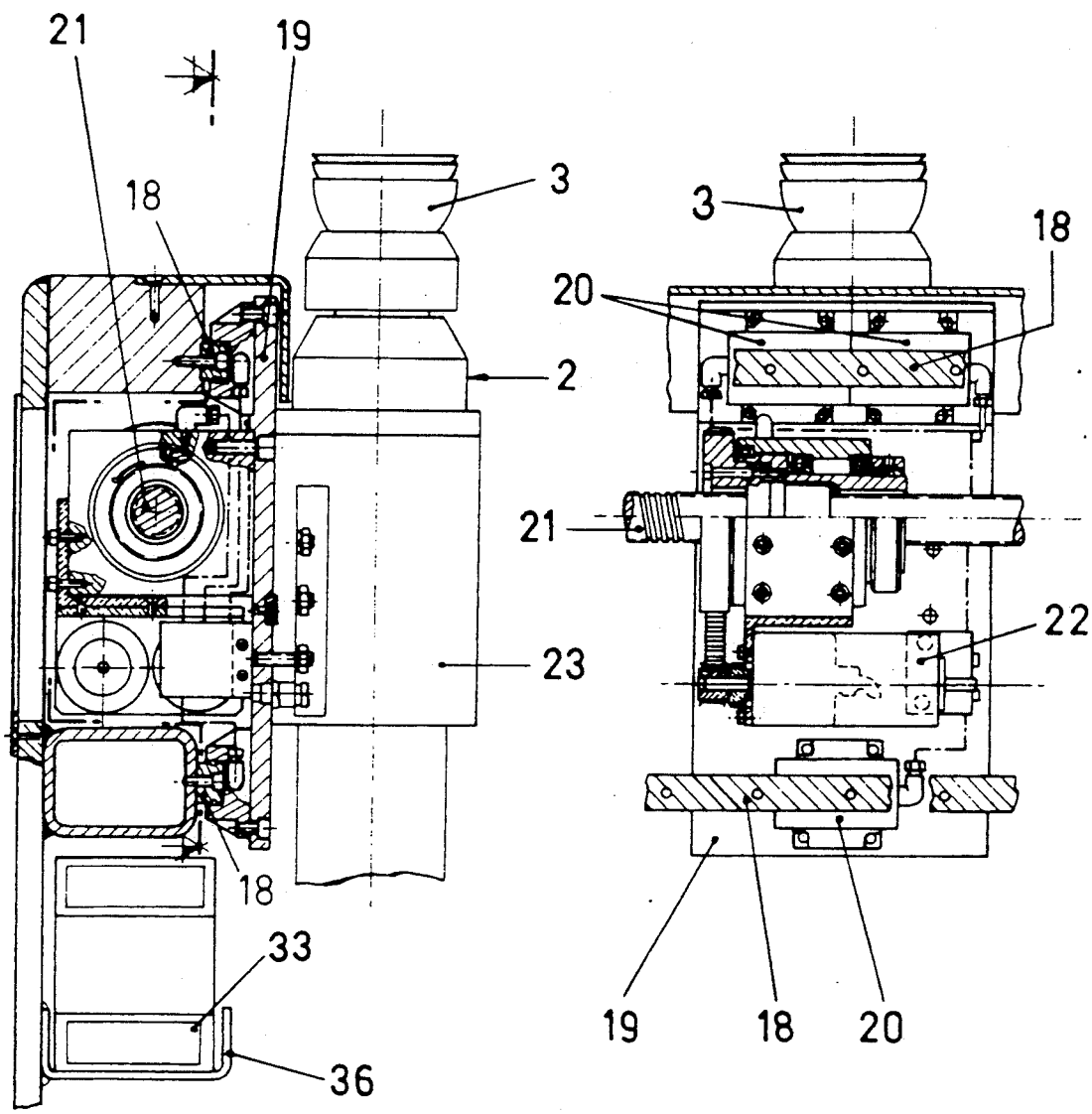
FIG. 7 is a view of an upper part of a column (2), in partial cross section.
FIG. 8 is a sectional view corresponding to FIG. 7.

As can be seen in FIGS. 7 and 8, along each module (1) are installed two guides (18), on which are mounted, by means of corresponding plates (19), the respective columns (2) which correspond to each one of the said modules (1), in such a way that the plates referred to (19), equipped with shoes (20) for sliding over the aforementioned guides (18), are capable of being moved along the two corresponding modules (1), in the transverse direction of the installation, following the direction indicated in FIG. 1, with the arrow marked number (7), transporting with them in this displacement to the respective corresponding columns (2) joined to the plates (19).

This displacement of the columns (2) following the direction (7), is effected by means of a leadscrew (21), which is common for all the columns (2) of each module (1), and above which said columns (2) are independently coupled, by means of respective nuts which are worked by respective motors (22) incorporated over the corresponding plates (19), each one of the said motors (22) being controlled in its position by an impulse meter.

Figure 9:
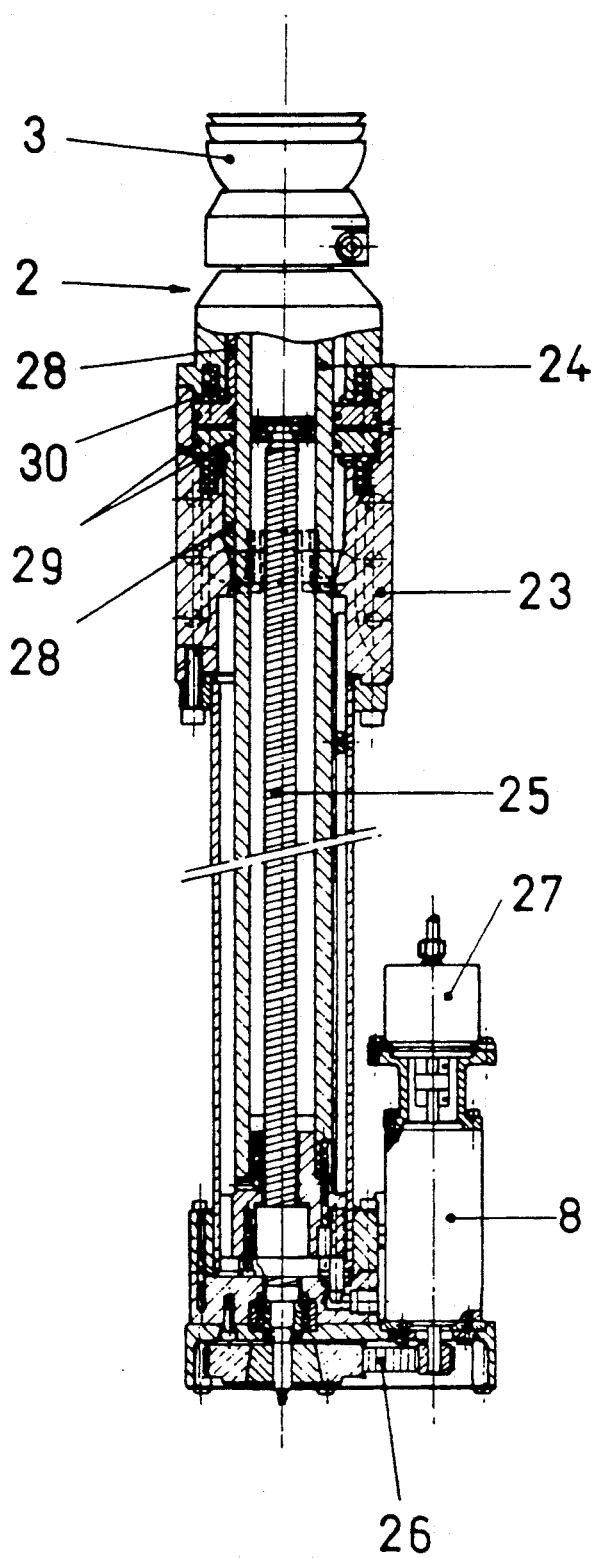
FIG. 9 is a cross sectional view of a column (2)

Each column (2) is equipped in addition with a body (23), through which as can be seen in FIG. 9, passes a hollow stem (24) guided axially, which at its upper end incorporates the fixing element (3), said stem (24) being vertically displaceable by means of a leadscrew (25).

The leadscrew (25) is driveable by means of a toothed belt (26) by a motor (8) with which each of the columns (2) is provided and which for its part is controlled by a respective rotary impulse meter (27).

In the interior of the body (23), the said vertically displaceable shaft (24) passes through a double clamp

Figure 10:
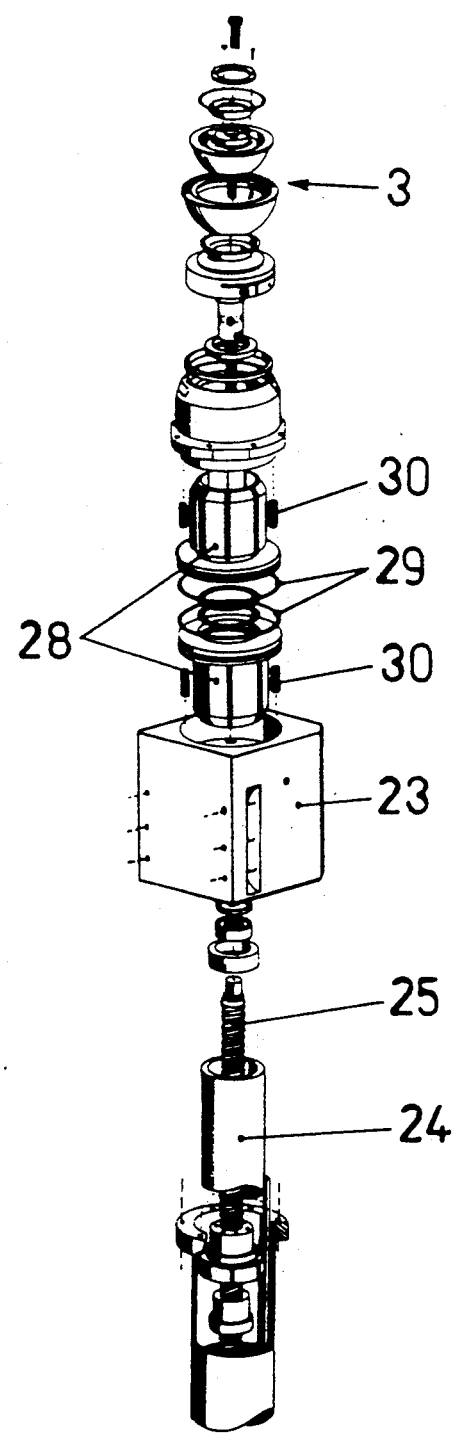
FIG. 10 is an exploded perspective view of the upper part of each column (2)
Figure 11:
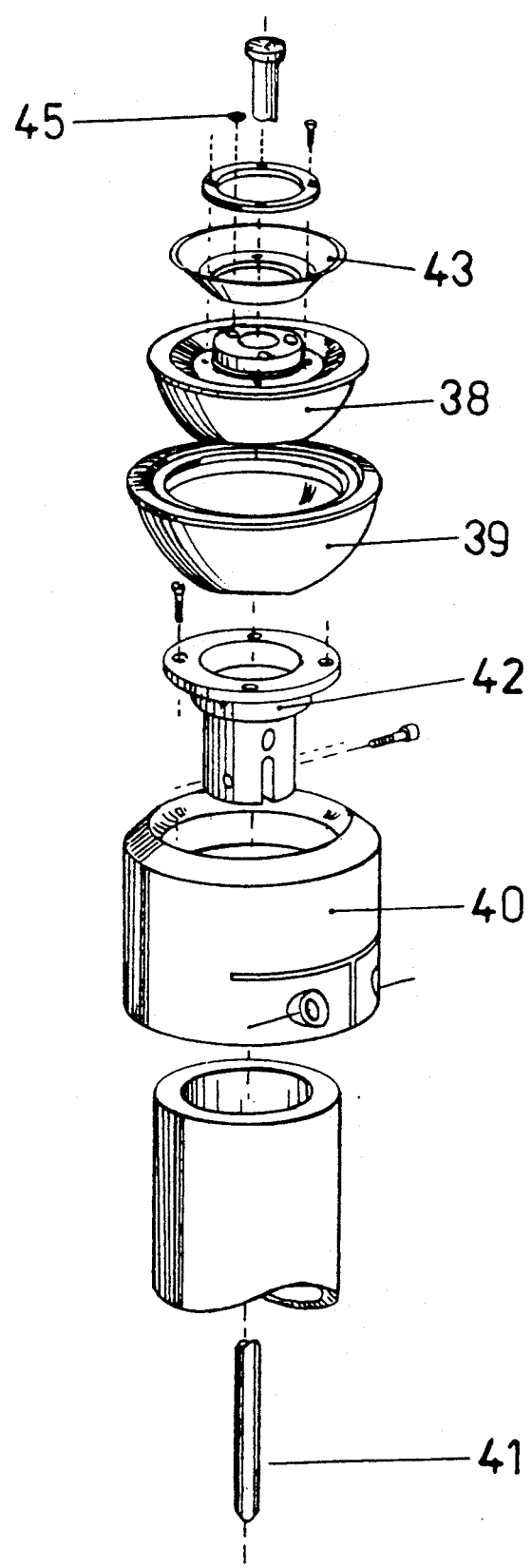
FIG. 11 is an enlarged exploded perspective view of a fixing member (3) incorporated in the upper end of the columns (2)
Figure 13:
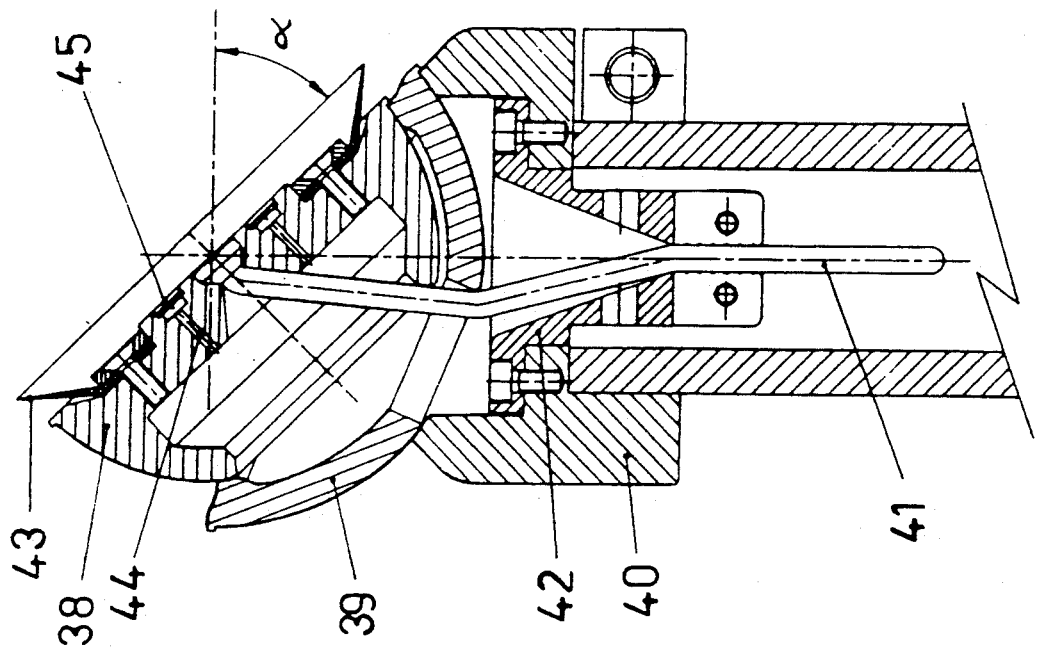
FIG. 13 is a view generally similar to FIG. 12, but with the moveable part of the fixing member (3) in a different operating position.
Figure 12:
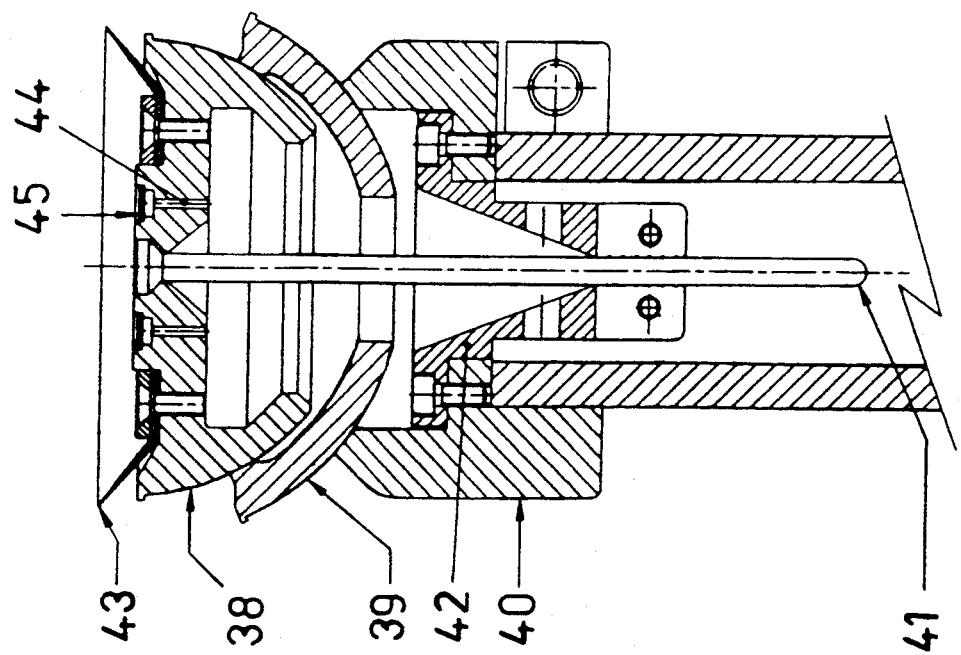
FIG. 12 is a greatly enlarged cross sectional side view of a fixing member (3)

(28) formed from two pieces which end in cones and have longitudinal slots which give flexibility (see FIG. 10), incorporating themselves between the double clamp (28), some joints (29) and spring means (30). In this way and if pressurised air is allowed to enter between the two parts which comprise the double clamp (28), those two parts are displaced in opposite directions, gripping the stem (24) and immobilising it in the position in which it finds itself, which allows a rigid axial fixing of each column (2) once the fixing member (3) is sited at the precise height in accordance with the contact which has to be established on the part (9) to be supported.

In this way the fixing member (3) which is incorporated in each column (2) can achieve a combined movement in three perpendicular directions, along the three axes X, Y and Z, which allows it to be fixed at any point in space. In this way the precise support can be achieved on the fixing members (3) of the corresponding part (9) which has to be sustained in each case, independently of the shape which the same may have and of the positioning in which it has to be placed.

The fixing members (3), are formed, as can be seen in FIGS. 10, 11, 12 and 13, by a set of two parts (38) and (39) in the shape of spherical shells, which are coupled together in a mutual engagement establishing a pivot assembly.

The external part (39) of this assembly, is arranged in support on the extremity of a bush like part (40), on which establishes in turn a pivot assembly coupling; the fixing together of all this assembly being established by means of an elastic connecting rod (41), which is held in tension by means of a bush (42) fixed in the interior of the part (40). This part (40) is that which in turn established the necessary fixing on the moveable tubular stem (24) of the column (2).

In this way, the assembly of each one of the said fixing members (3) allows a combined movement of the two pivot assemblies defined between the parts (38), (39) and (40), thus making possible a field of movement in inclination of the plane which contains the free edges of the part (38), with respect to the horizontal plane, to an angle "$a$" of some 45 degrees, (see FIG. 13), on the part (38), is incorporated moreover a suction cup (43), with which the support on the workpiece (9) which has to be supported, is obtained with an adhesive fixing, which assures a firm clamping.

But for greater effectiveness of the said fixing, in the actual front face of the part (38) are foreseen orifices (44), provided with respective filters (45) in its exterior opening, through which can be established, inside the assembly, the communication with a system of suction or vacuum, in such a way that the creation of a vacuum inside the suction cup (43), means that the fixing of the same in its support on the part (9) to be fixed, is totally effective.

This embodiment allows, in addition to the creation of a vacuum, the blowing in of air under pressure to help the initial movement of the parts to be worked on the fixing members (3) until the parts reach their correct position, at which time the entrance of pressurised air is interrupted and the fixing vacuum is established.

On the other hand the frame (4) of the installation is displaceable in turn in the longitudinal direction (6) of the installation, by means of respective guides and actuating mechanisms, which are also arranged below the floor; while the head (5) is displaceable in its turn along said frame (4), that is to say in the transverse direction (7) of the installation; while the support of the machining tools, which comprises the said head (5), is for its part movably positionable, both in the vertical direction and in rotation, for its correct incidence on the points to be machined in the part (9) on which one has to work.

In this way the installation allows the fixing in space in a precise and exact manner, of whatever type of part (9) is to be machined, independently of its form and dimensions, and of the position in which it has to be situated to perform on it the necessary operations by means of the implements or tools of the head (5) incorporated in the frame (4), which during the work process will constantly manoeuvre to the corresponding work positions, while the columns (2) remain static sustaining the workpiece (9) to be worked on, in the precise position for the carrying out of the work.

In so far as the frame (4) is concerned, as can be seen in FIGS. 3 and 4, the displacements of the same are achieved on rolling guides defined on corresponding beams (31), the mounting of the said frame (4) in relation to the aforementioned beams (31) being achieved by means of plates (32) which pass through a slot formed in the floor; while the actuation is achieved, at both ends of the said frame (4), by means of two synchronised reduction motors, which engage with helicoidal racks fixed to the beams (31), the displacement being controlled by two linear impulse meters situated on the said beams (31).

It is foreseen that, for the control and command of all the moveable elements of the installation, the corresponding actuating members of said moveable elements are connected with a programmable computer unit, in such a way that introducing in the same the precise information in each case, by means of the corresponding programme, the process of positioning of the different columns (2) in the directions (6) and (7) of the installation and the height positioning of the corresponding fixing members (3) of the upper end of the same, to conform to the shape, dimensions and positioning of the corresponding workpiece (9), are produced in a totally automatic manner and with the most absolute precision, equally the mobility of the frame (4) and of the corresponding head (5), are produced also in an automatic way to act on each one of the points of the workpiece (9) on which work has to be carried out.

Thus for example, for the height positioning of the members (3) in accordance with the corresponding part (9) which is to be supported, as can be seen in the diagram in FIG. 14, each column (2) is connected with a corresponding control unit (46) provided with a microprocessor; the different control units (46) for the particular columns (2) are connected, through a central processing unit "CPU" (47) with the controlling computer (48); in such a way that from the said computer (48) the corresponding order is sent to each control unit (46), of the position which its respective column (2) must occupy, at the same time as the computer itself (48) is informed of the actual position of each column (2), in order to suitably control the process.

The system can moreover incorporate a remote control unit (49), by means of which any of the columns (2) are able to be manipulated manually, raising or lowering it to the situation of the corresponding member (3) in the suitable position, which allows, amongst other things, the possibility of manual adaptations to overcome unforeseen irregularities which the supported part (9) may have.

Likewise it is foreseen that the elastic connecting rod (41) of each fixing member (3) should have a lower pipe through which to blow in air at low pressure, this pipe being open in the upper part of the connecting rod (41) and coupled by its middle lower part to a pressure sensor.

When contact is established between the fixing member (3) and the part to be machined (9) the air exit closes, increasing the pressure within the inner pipe of the connecting rod (41), which is detected by the pressure sensor, this giving the signal that the contact has been made.

In this way a rapid approach of the columns (2) towards the part (9) can be achieved to a prearranged distance and from here a slow approach until contact with the part (9) is detected by the aforementioned pressure sensor. With this the contact between each fixing member (3) and the part (9) can always be assured even in the case where there are irregularities which have not been detected and, also, the actual system can thus offer information on the differences between the marked distances and the real distances at which the contact has been produced, which serves as a test of the surface irregularities of the parts to be machined (9).

All the electrical connections to the actuating means of the modules (1), as well as to the actuating means of the frame (4), and the arrangement of the necessary fluid pipes are attained through carrying chains (16) which extend beneath the floor, as can be seen in FIGS. 3, 4, and 5, which completely eliminates the obstructions and risks of accident which said cables and pipes can create.

The supply to the particular columns (2) of the different modules (1) is achieved also by means of carrying chains (33) through the interior of which pass all the feed pipes to the said columns (2), both for air under pressure and vacuum and those which supply electricity; in such a way that no cable nor tube is ever visible.

It has been foreseen, as a preferred solution, that the chains (33) of some of the columns (2) of each module (1), issue from an enclosure (35) situated in one side of the installation, and the chains (33) of the other columns (2) of each module (1) from an enclosure (34) situated in the opposite side.

Figure 6:
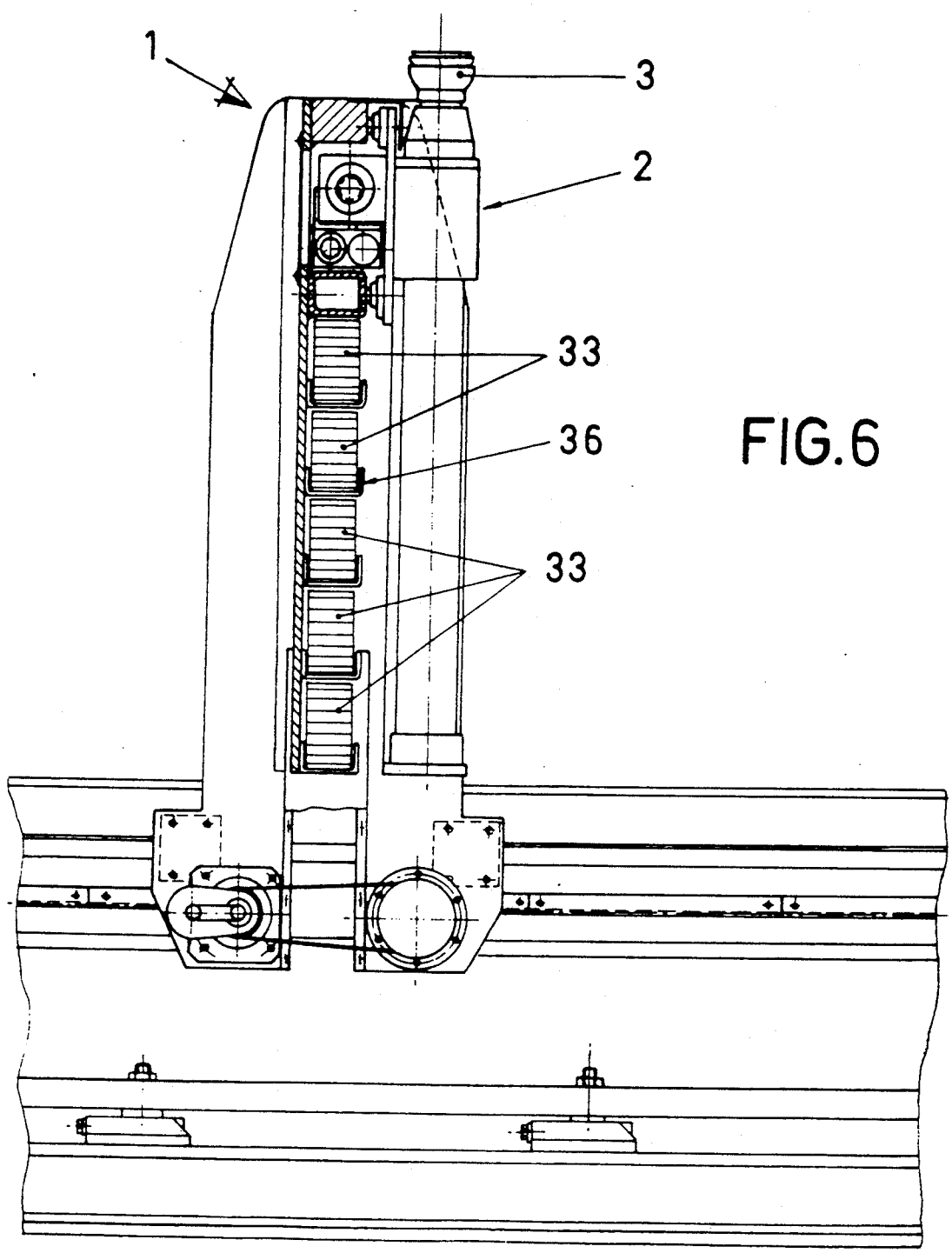
FIG. 6 is a transverse cross sectional view of a module.

In FIG. 6, it can be seen moreover how the different chains (33) which correspond to the particular columns (2) of each module (1), are arranged on "U" shaped support profiles (36), which keep them completely isolated so as not to interfere with each other.

The side plates (11), by means of which each module (1) is supported, and through which is achieved the moveable mounting of the same on the corresponding beams (10) situated beneath the floor, pass through the floor through longitudinal slots which are closed by means of flexible joints (17), as can be seen in detail in FIG. 5; while the plates (32), through which is achieved the moveable mounting of the frame (4) on the beams (31), pass in their turn through corresponding longitudinal slots in the floor, which in their case are closed by a steel strip (37) which is shaped like a loop, being joined by its extremities to the corresponding plate (32), in such a way that said strip (37) is displaced in conjunction with the frame (4), bringing about the closing of the respective slot in step with the corresponding plate (32), along the whole length of the installation, except for the space occupied by the plate itself (32), where it is the said plate (32) which causes the closing of the slot.

In this way the displacement of the moveable elements is achieved without the least obstacle, and at the same time completely blocks the passage of swarf, debris and dirt to the lower area where are housed the mechanisms and displacement guides of the frame (4) and of the modules (1), thereby permitting easy cleaning of the area, seeing that through the displacement of the frame (4) and of the modules (1) towards one end, the whole of the floor level remains totally free.

Without altering the essence of the invention, the possibility is foreseen that the beams (11) and (31), on which are made up the longitudinal guides for the frame (4) and the modules (1), can be situated above floor level, according to a variation in the practical embodiment. Likewise it has been foreseen, as another variation in the practical embodiment, that the different columns (2) may be arranged in a trench, which would allow the fixing members (3) to be closer in relation to floor level, giving access to those working on them across bridges and catwalks which would extend across such trenches. These embodiments or any other will be a function of the characteristics of the place where the installation is mounted and of the characteristics of the parts (9) which are to be worked, but do not in any case alter the essence of the invention while the essential characteristics of the same are maintained, with regard to the positioning of the support columns (2), the double joint assembly of the fixing members (3), etc.

I claim:

1. A machine tool installation comprising a frame, a track along which the frame is movable, a machining head on the frame and movable transversely of the track and workpiece support means, wherein the support means comprises a plurality of modules extending transversely of the track and independently movable along the track, a plurality of columns on each of the modules, each of the columns being independently movable along the modules, a workpiece fixing member at the upper end of each column and which can be moved vertically, and computer control means for controlling all the aforesaid movements in three perpendicular directions to permit the automatic positioning of the fixing members until they occupy the desired positions for supporting and fixing the workpiece during machining.

2. A machine tool installation according to claim 1, wherein each fixing member comprises respective upper and lower part-spherical pieces which are coupled together to form a cup and ball joint assembly, a support face provided with a suction cup on the upper piece, the lower piece forming a cup and ball joint assembly on a bush mounted on the column, and an elastic connecting means extending centrally through the fixing member and connected at its respective ends to the upper piece and to the bush to couple the fixing member together to define a double joint assembly between the pieces and the bush whereby the suction cup can be inclined up to forty five degrees with respect to the column.

3. A machine tool installation according to claim 2, wherein the upper part spherical piece has a central orifice for the passage of the elastic connecting means and a plurality of orifices covered by filters through which air can be blown or suction applied, and wherein said elastic connecting means is formed with a head by which it is retained in the upper piece and a clamp fixed to the bush and by which the elastic connecting means is retained at its lower end.

4. A machine tool installation according to claim 1 wherein each column has a hollow stem, the upper end of which carries the fixing member, a leadscrew being arranged within the stem and driven by an independent motor controlled by an impulse meter; each column incorporating, for the control of its motor, an electronic control unit, equipped with a microprocessor and connected by means of a central processing unit, with a governing computer.

5. A machine tool installation according to claim 4, wherein each column incorporates a pneumatically actuated clamp for clamping the stem against movement.

6. A machine tool installation according to claim 1 characterised in that electrical feeds and fluid feeds to the mechanisms of the frame to those of the modules and to those of the columns are achieved by means of respective longitudinal and transverse cable carrying chains which are arranged, one on top of the other, in vertical correlation, and wherein the chains of the columns of each module extend between enclosures situated at the opposite ends of the modules.

7. A machine tool installation according to claim 1, comprising track means arranged under the floor and on which the modules can move, each module being supported on end plates which are slidable along the tracks and comprising motor means for moving the modules along the tracks, the motor means being controlled by respective impulse meters, and being operatively coupled to rack and pinion means disposed at each end of the modules.

8. A machine tool installation according to claim 7 wherein the floor is formed with slots through which end plates extend and means closing the slots.

9. A machine tool installation according to claim 1, wherein the movement of the columns along the corresponding modules is achieved on common guides by common leadscrews engaged by respective independent nuts for each column and which nuts are driven by independent motors which are controlled by impulse meters.

* * * * *

UNITED STATES PATENT AND TRADEMARK OFFICE
CERTIFICATE OF CORRECTION

PATENT NO. : 5,163,793

DATED : Nov. 17, 1992

INVENTOR(S) : Manuel TORRES MARTINEZ

It is certified that error appears in the above-identified patent and that said Letters Patent is hereby corrected as shown below:

On the title page, Item [76] Inventor: "Manuel T. Martinez" should read —Manuel TORRES MARTINEZ—.

Signed and Sealed this

Twelfth Day of October, 1993

Attest:

BRUCE LEHMAN

Attesting Officer

Commissioner of Patents and Trademarks